(12) United States Patent
Dressel et al.

(10) Patent No.: US 12,198,422 B2
(45) Date of Patent: Jan. 14, 2025

(54) STEREO ABORT OF UNMANNED AERIAL VEHICLE DELIVERIES

(71) Applicant: Wing Aviation LLC, Mountain View, CA (US)

(72) Inventors: Louis Kenneth Dressel, San Francisco, CA (US); Kyle David Julian, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 254 days.

(21) Appl. No.: 17/830,151

(22) Filed: Jun. 1, 2022

(65) Prior Publication Data
US 2023/0394814 A1   Dec. 7, 2023

(51) Int. Cl.
| | |
|---|---|
| *G06V 20/17* | (2022.01) |
| *B64C 39/02* | (2023.01) |
| *G05D 1/00* | (2006.01) |
| *B64U 101/30* | (2023.01) |
| *B64U 101/60* | (2023.01) |

(52) U.S. Cl.
CPC ............ *G06V 20/17* (2022.01); *B64C 39/024* (2013.01); *G05D 1/042* (2013.01); *B64U 2101/30* (2023.01); *B64U 2101/60* (2023.01); *B64U 2201/10* (2023.01)

(58) Field of Classification Search
CPC .... G06V 20/17; G05D 1/042; B64U 2101/30; B64U 2101/60; B64U 2201/10
USPC ............................................................ 701/3
See application file for complete search history.

(56) References Cited

U.S. PATENT DOCUMENTS

| | | | |
|---|---|---|---|
| 10,049,589 B1* | 8/2018 | Boyd ..................... | G05D 1/106 |
| 2012/0201424 A1* | 8/2012 | Masalkar ................ | G06F 3/017 |
| | | | 382/106 |
| 2017/0090271 A1 | 3/2017 | Harris et al. | |
| 2017/0275023 A1* | 9/2017 | Harris ..................... | H04N 5/33 |
| 2019/0087635 A1 | 3/2019 | Klaus | |
| 2019/0248487 A1 | 8/2019 | Holtz et al. | |
| 2019/0317530 A1* | 10/2019 | Yang .................... | G08G 5/0013 |
| 2020/0207474 A1 | 7/2020 | Foggia et al. | |
| 2021/0264660 A1* | 8/2021 | Naimin .................. | G06T 19/00 |
| 2022/0121836 A1* | 4/2022 | Dins .................... | G05D 1/0676 |
| 2022/0144186 A1* | 5/2022 | Heafitz .................. | G03B 35/18 |
| 2023/0245444 A1* | 8/2023 | Brockers ................ | G06V 20/17 |
| | | | 348/144 |

* cited by examiner

*Primary Examiner* — Isaac G Smith
(74) *Attorney, Agent, or Firm* — McDonnell Boehnen Hulbert & Berghoff LLP

(57) ABSTRACT

A method includes, during a delivery process of an unmanned aerial vehicle (UAV), receiving, by an image processing system, a depth image captured by a downward-facing stereo camera on the UAV. One or more pixels are within a sample area of the depth image and are associated with corresponding depth values indicative of distances of one or more objects to the downward-facing stereo camera. The method also includes determining, by the image processing system an estimated depth value representative of depth values within the sample area. The method further includes determining that the estimated depth value is below a trigger depth. The method further includes, based at least on determining that the estimated depth value is below the trigger depth, aborting the delivery process of the UAV.

20 Claims, 14 Drawing Sheets

| 600 | | | | | | | | | | |
|---|---|---|---|---|---|---|---|---|---|---|
| 29 | 29 | 29 | 29 | 28 | 30 | 29 | 28 | 29 | 29 | 29 |
| 29 | 29 | 30 | 28 | 29 | 29 | 28 | 29 | 29 | 29 | 29 |
| 29 | 29 | 29 | 28 | 28 | 29 | 29 | 28 | 29 | 28 | 29 |
| 29 | 29 | 29 | 30 | 29 | 30 | 28 | 30 | 28 | 29 | 29 |
| 29 | 29 | 29 | 29 | 29 | 29 | 29 | 29 | 29 | 29 | 29 |
| 29 | 29 | 28 | 28 | 29 | 29 | 29 | 29 | 29 | 28 | 29 |
| 29 | 29 | 29 | 29 | 28 | 29 | 29 | 29 | 8 | 28 | 30 |
| 29 | 29 | 29 | 29 | 29 | 29 | 30 | 29 | 29 | 28 | 29 |
| 29 | 29 | 29 | 29 | 29 | 29 | 28 | 23 | 28 | 28 | 29 |
| 29 | 29 | 29 | 8 | 29 | 30 | 29 | 24 | 28 | 28 | 28 |
| 30 | 29 | 8 | 8 | 8 | 29 | 29 | 22 | 28 | 30 | 29 |
| 29 | 29 | 6 | 5 | 6 | 6 | 29 | 22 | 22 | 29 | 29 |
| 29 | 29 | 29 | 6 | 6 | 8 | 29 | 22 | 22 | 29 | 29 |
| 29 | 29 | 8 | 8 | 8 | 29 | 29 | 29 | 29 | 8 | 8 |
| 29 | 6 | 6 | 5 | 6 | 29 | 29 | 29 | 8 | 8 | 8 |
| 29 | 6 | 6 | 5 | 6 | 6 | 8 | 8 | 8 | 8 | 8 |
| 29 | 29 | 6 | 6 | 6 | 8 | 8 | 8 | 8 | 8 | 8 |
| 29 | 29 | 8 | 8 | 8 | 8 | 8 | 8 | 8 | 8 | 8 |
| 8 | 8 | 8 | 8 | 8 | 8 | 8 | 8 | 8 | 8 | 8 |

Figure 7

| 800 | | | | | | | | | | |
|---|---|---|---|---|---|---|---|---|---|---|
| 29 | 29 | 29 | 29 | 28 | 30 | 29 | 28 | 29 | 29 | 29 |
| 29 | 29 | 30 | 28 | 29 | 29 | 28 | 29 | 29 | 29 | 29 |
| 29 | 29 | 29 | 28 | 28 | 29 | 29 | 28 | 29 | 28 | 29 |
| 29 | 29 | 29 | 30 | 29 | 30 | -1 | 30 | 28 | 29 | 29 |
| 29 | 29 | 29 | 29 | 29 | 29 | 29 | 29 | 29 | 29 | 29 |
| 29 | 29 | 28 | 28 | 29 | 29 | 29 | 29 | 29 | 28 | 29 |
| 29 | 29 | 29 | 29 | 28 | 29 | 29 | 29 | 8 | -1 | 30 |
| 29 | 29 | 29 | 29 | 29 | 29 | 30 | 29 | 29 | 28 | 29 |
| 29 | 29 | 29 | 29 | 29 | 29 | 28 | 23 | 28 | 28 | 29 |
| 29 | 29 | -1 | -1 | -1 | -1 | 29 | 24 | 28 | 28 | 28 |
| 30 | -1 | 8 | 8 | 8 | -1 | 29 | 22 | 28 | 30 | 29 |
| 29 | -1 | 6 | 5 | 6 | -1 | -1 | 22 | 22 | 29 | 29 |
| 29 | -1 | 29 | 6 | 6 | 8 | -1 | 22 | 22 | -1 | -1 |
| 29 | -1 | 8 | 8 | 8 | -1 | 29 | 29 | -1 | 8 | 8 |
| -1 | 6 | 6 | 5 | 6 | -1 | -1 | -1 | 8 | 8 | 8 |
| 29 | 6 | 6 | 5 | 6 | 6 | 8 | 8 | 8 | 8 | 8 |
| 29 | 29 | 6 | 6 | 6 | 8 | 8 | 8 | 8 | 8 | 8 |
| 29 | 29 | 8 | 8 | 8 | 8 | 8 | 8 | 8 | 8 | 8 |
| 8 | 8 | 8 | 8 | 8 | 8 | 8 | 8 | 8 | 8 | 8 |

STEREO ABORT OF UNMANNED AERIAL VEHICLE DELIVERIES

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Examples disclosed herein include methods for evaluating delivery points to avoid collisions caused by delivering onto and/or in close proximity to various obstacles. A UAV may receive a depth image. Based on the depth image, the UAV may determine an estimated depth value representative of the depth values within a sample area of the depth image. If the estimated depth value is below a trigger depth, the UAV may abort a delivery process of the UAV.

In a first aspect, a method includes during a delivery process of an unmanned aerial vehicle (UAV) receiving, by an image processing system, a depth image captured by a downward-facing stereo camera on the UAV. One or more pixels are within a sample area of the depth image and are associated with corresponding depth values indicative of distances of one or more objects to the downward-facing stereo camera. The method further includes determining, by the image processing system, an estimated depth value representative of depth values within the sample area. The method additionally includes determining that the estimated depth value is below a trigger depth. The method also includes, based at least on determining that the estimated depth value is below the trigger depth, aborting the delivery process of the UAV.

In a second aspect, an unmanned aerial vehicle (UAV) comprises a downward-facing stereo camera and a control system. The control system is configured to, during a delivery process of the UAV, receive, by an image processing system, a depth image captured by the downward-facing stereo camera on the UAV. One or more pixels are within a sample area of the depth image and are associated with corresponding depth values indicative of distances of one or more objects to the downward-facing stereo camera. The control system is also configured to determine, by the image processing system, an estimated depth value representative of depth values within the sample area. The control system is further configured to determine that the estimated depth value is below a trigger depth. The control system is additionally configured to based at least on determining that the estimated depth value is below the trigger depth, abort the delivery process of the UAV.

In a third aspect, a non-transitory computer readable medium comprising program instructions executable by one or more processors to perform operations comprising, during a delivery process of a UAV, receiving, by an image processing system, a depth image captured by a downward-facing stereo camera on the UAV. One or more pixels are within a sample area of the depth image and are associated with corresponding depth values indicative of distances of one or more objects to the downward-facing stereo camera. The operations further comprise determining, by the image processing system, an estimated depth value representative of depth values within the sample area. The operations also comprise determining that the estimated depth value is below a trigger depth. The operations additionally comprise based at least on determining that the estimated depth value is below the trigger depth, aborting the delivery process of the UAV.

In a fourth aspect, a system is provided that includes means for, during a delivery process of an unmanned aerial vehicle (UAV), receiving, by an image processing system, a depth image captured by a downward-facing stereo camera on the UAV. One or more pixels are within a sample area of the depth image and are associated with corresponding depth values indicative of distances of one or more objects to the downward-facing stereo camera. The system further includes means for determining, by the image processing system, an estimated depth value representative of depth values within the sample area. The system also includes means for determining that the estimated depth value is below a trigger depth. The system additionally includes means for based at least on determining that the estimated depth value is below the trigger depth, aborting the delivery process of the UAV.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 7 illustrates a sample area within a depth image, in accordance with example embodiments.

FIG. 8 illustrates a sample area within a depth image, in accordance with example embodiments.

DETAILED DESCRIPTION

Figure 1A:
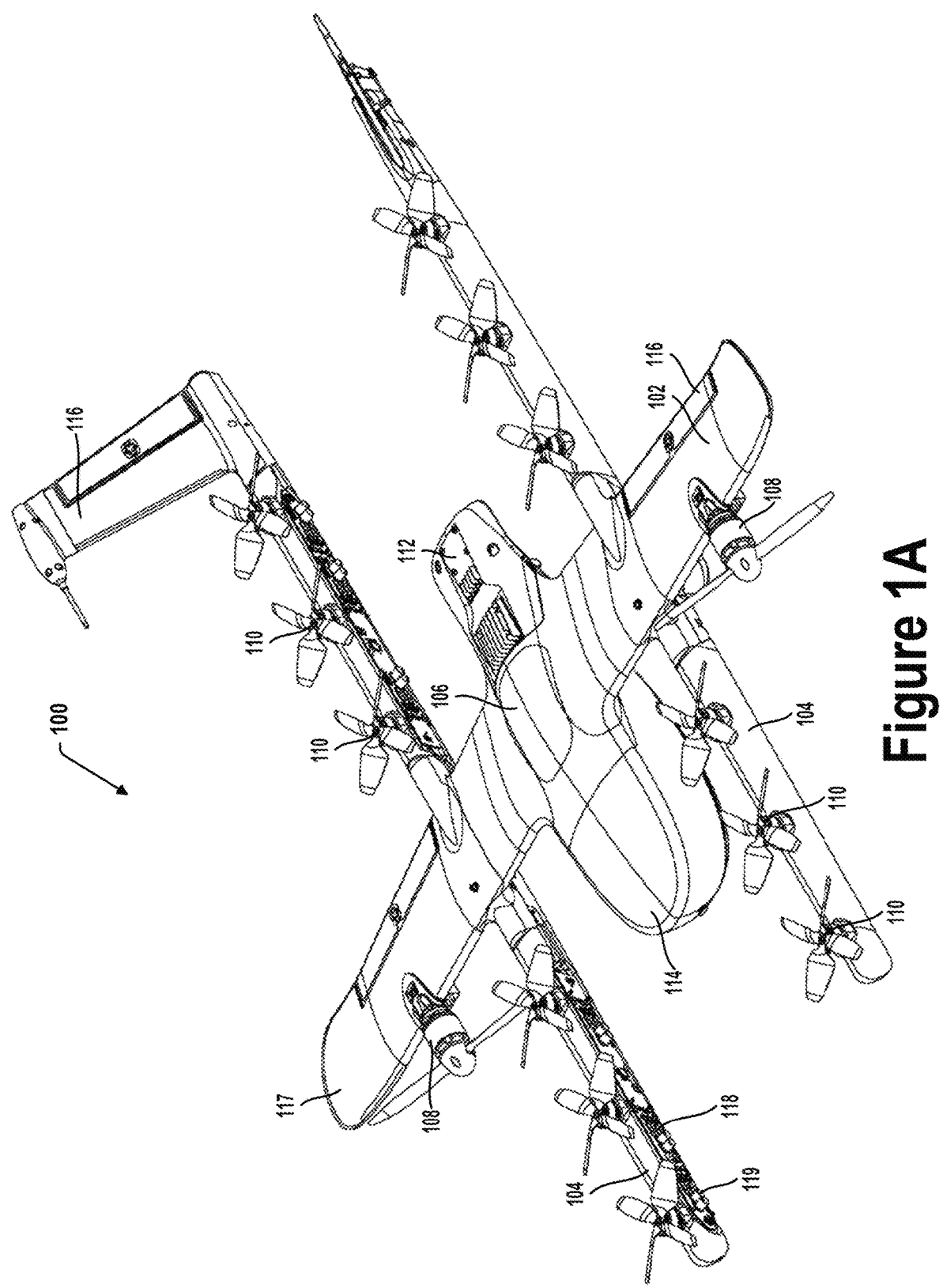
FIG. 1A is a simplified illustration of an unmanned aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

An example usage of UAVs may be to deliver various items to customers. For example, a UAV may be tasked with picking up a payload containing an item from a location and delivering the payload to a customer's residence, commercial building, or other location. During this delivery process, one potential problem that might arise may be determining an appropriate delivery location to safely deliver the payload. A delivery location positioned next to the customer's house or commercial building may be obstructed by various objects, such as trees, roads, sidewalks, cars, among other examples. Attempting to deliver the payload in one of these locations may cause the UAV to crash into one or more of the objects present, resulting in damage to the UAV, the payload, the contents of the payload, and/or the object.

Therefore, when the UAV is delivering the payload, it may be important to ensure that the payload is not dropped off at a delivery location that contains many objects and to abort delivery if the UAV detects that the environment contains many objects. For example, if the delivery area is an area densely populated with trees and buildings, the UAV may abort the delivery process due to the objects in the delivery area. As another example, the delivery area may be in a suburban neighborhood with large lawns, and the UAV may determine that delivery to this area may be safely completed.

Provided herein are methods for evaluating delivery locations to avoid collisions caused by delivering onto and/or in close proximity to various objects. In some examples, the UAV may determine whether to abort a delivery process based on how far the UAV is from various objects in the environment. The UAV may include a downward-facing stereo camera or other sensor arrangement, which the UAV may use to capture images of the environment. The downward-facing stereo camera or other sensor arrangement may include one or more cameras. The cameras may capture images of overlapping areas of the environment, which the UAV, downward-facing stereo camera, and/or other sensor arrangement may use to determine a depth image.

The depth image may include one or more pixels, and each pixel may indicate distances of an object to the downward-facing stereo camera. For example, if the object is 10 meters tall and the UAV is at an altitude of 30 meters, the value at a pixel representing the location of the tree may be 20 meters. The UAV may use this depth image to determine whether to deliver to the delivery location captured by the depth image.

The UAV may use the depth image to determine an estimated depth value of a sample area within the depth image. The depth image may include one or more pixels associated with corresponding depth values indicating distances of one or more objects to the downward-facing stereo camera, and the sample area may include a subset of these depth images. In some examples, the sample area may be centered on the depth image and a circular portion of the depth image. Additionally or alternatively, the sample area may be such that the region of the delivery location represented by the sample area is directly below the UAV (e.g., centered around a pixel that is directly below the UAV, perhaps along the gravity vector of the UAV). In some examples, to determine an estimated depth value, the UAV may sort the depth values within the sample area and determine an estimated depth value based on the estimated depth value being above a threshold percentage of depth values in the sorted list.

The UAV may use the estimated depth value as a basis to determine whether to deliver to complete the delivery process. In particular, the UAV may compare the estimated depth value with a trigger depth to determine whether to abort the delivery. If the estimated depth value is less than the trigger depth, the UAV may abort the delivery process. Whereas, if the estimated depth value is greater than the trigger depth, the UAV may continue the delivery process. For example, if the estimated depth value is eight meters (e.g., eight meters from the downward-facing camera of the UAV to an object in the environment) and the trigger depth is nine meters (e.g., the UAV may continue to descend nine or more meters above ground before delivering the payload), the UAV may determine to abort delivery of the payload.

In some examples, the trigger depth may be based on a vertical descent speed of the UAV. For example, if the UAV is descending at a greater vertical speed, the trigger depth may be a greater trigger depth to account for the distance needed to stop the UAV before delivering a package. In contrast, the trigger depth may be a lesser trigger depth if the UAV is descending slower, as the UAV may not need as much distance to fully stop.

In some examples, the depth image may contain invalid pixels, and the UAV may determine whether the estimated depth value is a valid estimated depth value based on the amount of invalid pixels in the sample area. Invalid pixels may be pixels where the UAV was unable to determine a depth value. If the number of invalid pixels within the sample area is greater than a threshold number of invalid pixels, the UAV may determine that the estimated depth value is not a valid depth value. If the UAV determines that the estimated depth value is not a valid depth value, the UAV may then capture another depth image to evaluate for an estimated depth value.

Further, the UAV may capture one or more additional depth images to facilitate evaluating whether to abort delivery of the payload. In particular, the UAV may determine whether the estimated depth values of the consecutively captured images are also less than the trigger depth. If the estimated depth values of the consecutively captured images are all less than the trigger depth, the UAV may decide to abort delivery of the payload. Evaluating one or more additional depth images may help to avoid depth image inaccuracies.

II. EXAMPLE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rot, raft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
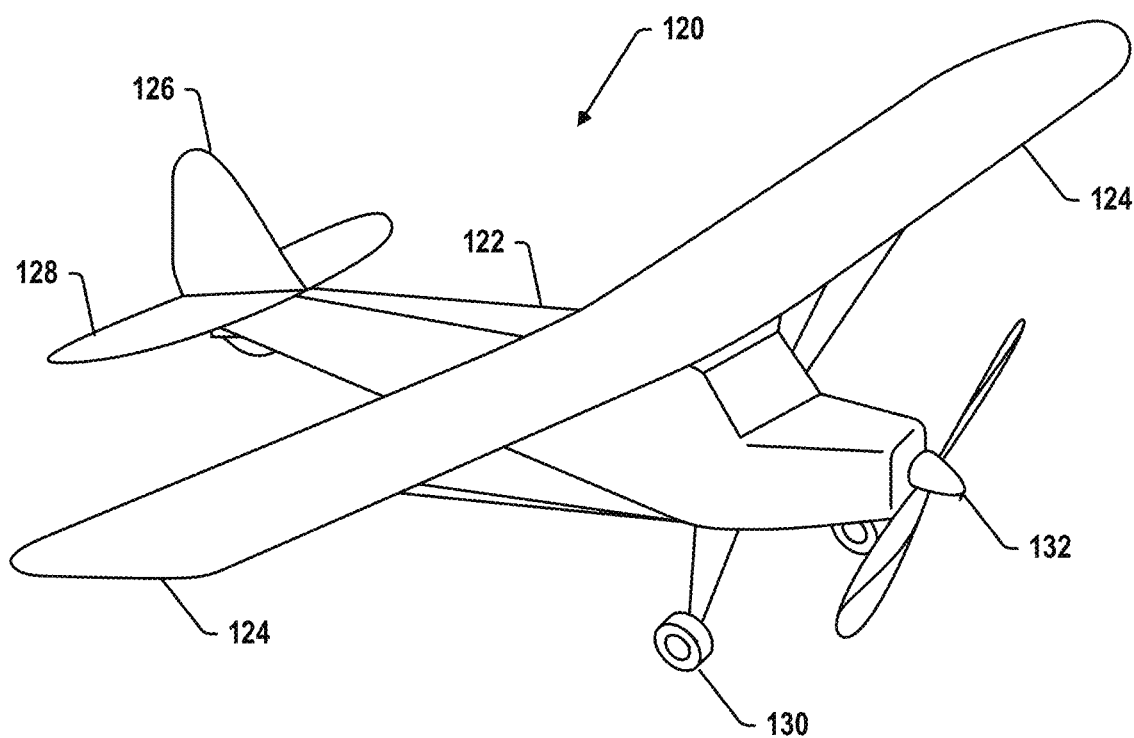
FIG. 1B is a simplified illustration of an unmanned aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
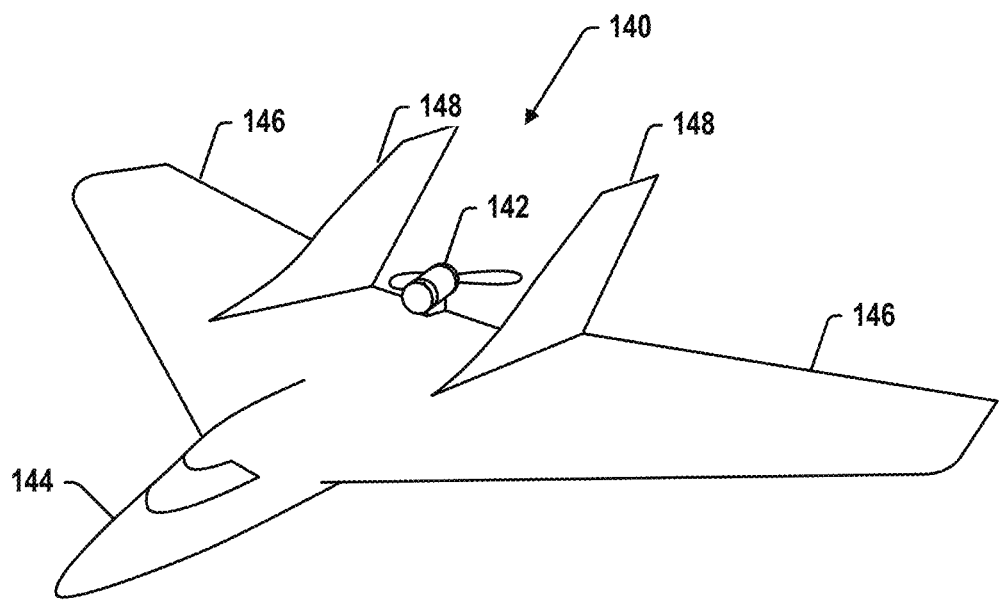
FIG. 1C is a simplified illustration of an unmanned aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
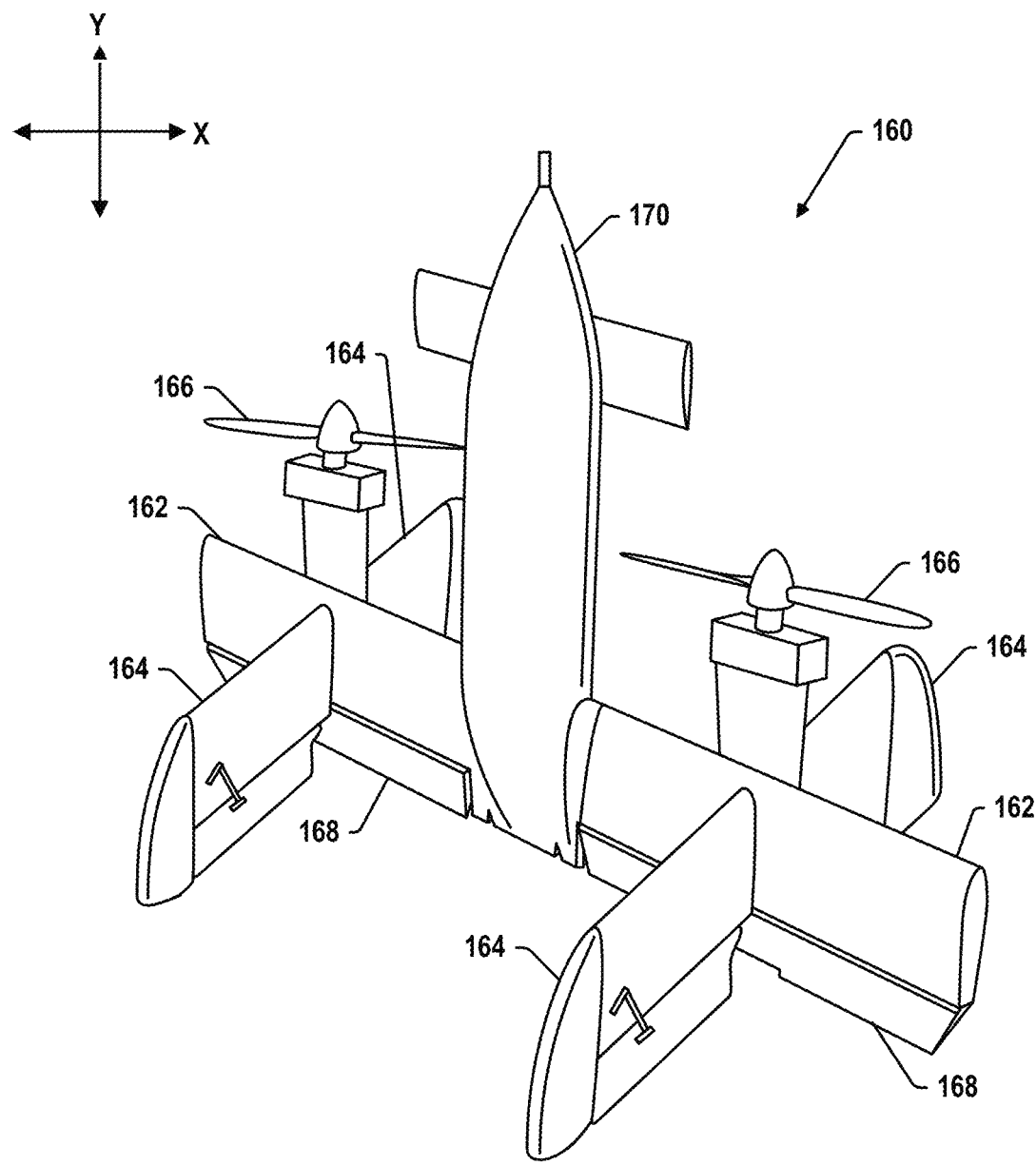
FIG. 1D is a simplified illustration of an unmanned aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
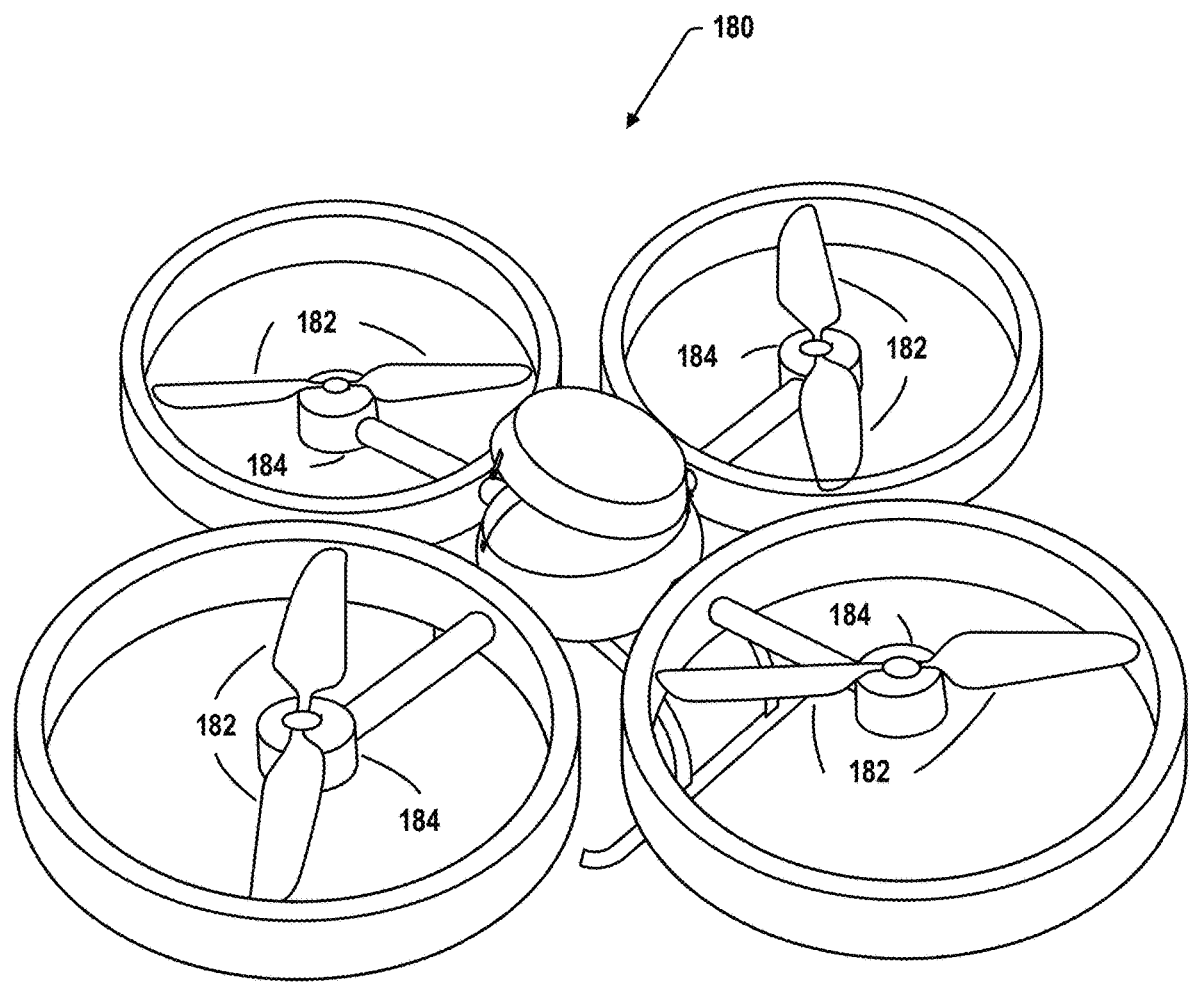
FIG. 1E is a simplified illustration of an unmanned aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multi copter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
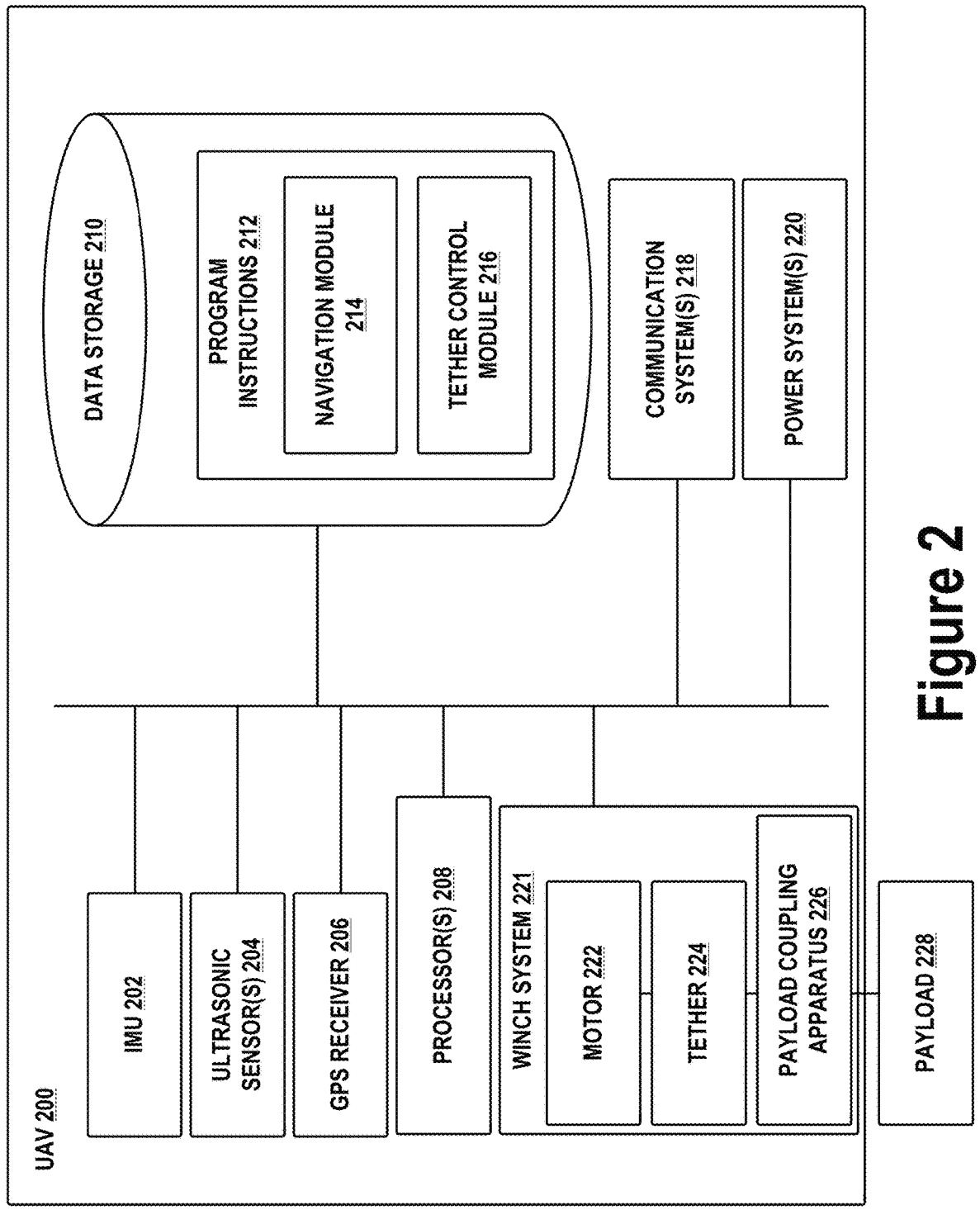
FIG. 2 is a simplified block diagram illustrating components of an unmanned aerial vehicle, in accordance with example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a UPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or snore computer-readable storage media that can be read or accessed by at least one processor 208. The one or more computer-readable storage media can include volatile and/or non-volatile storage components, such as optical, magnetic, organic or other memory or disc storage, which can be integrated in whole or in part, with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as some altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot," or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV.

In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
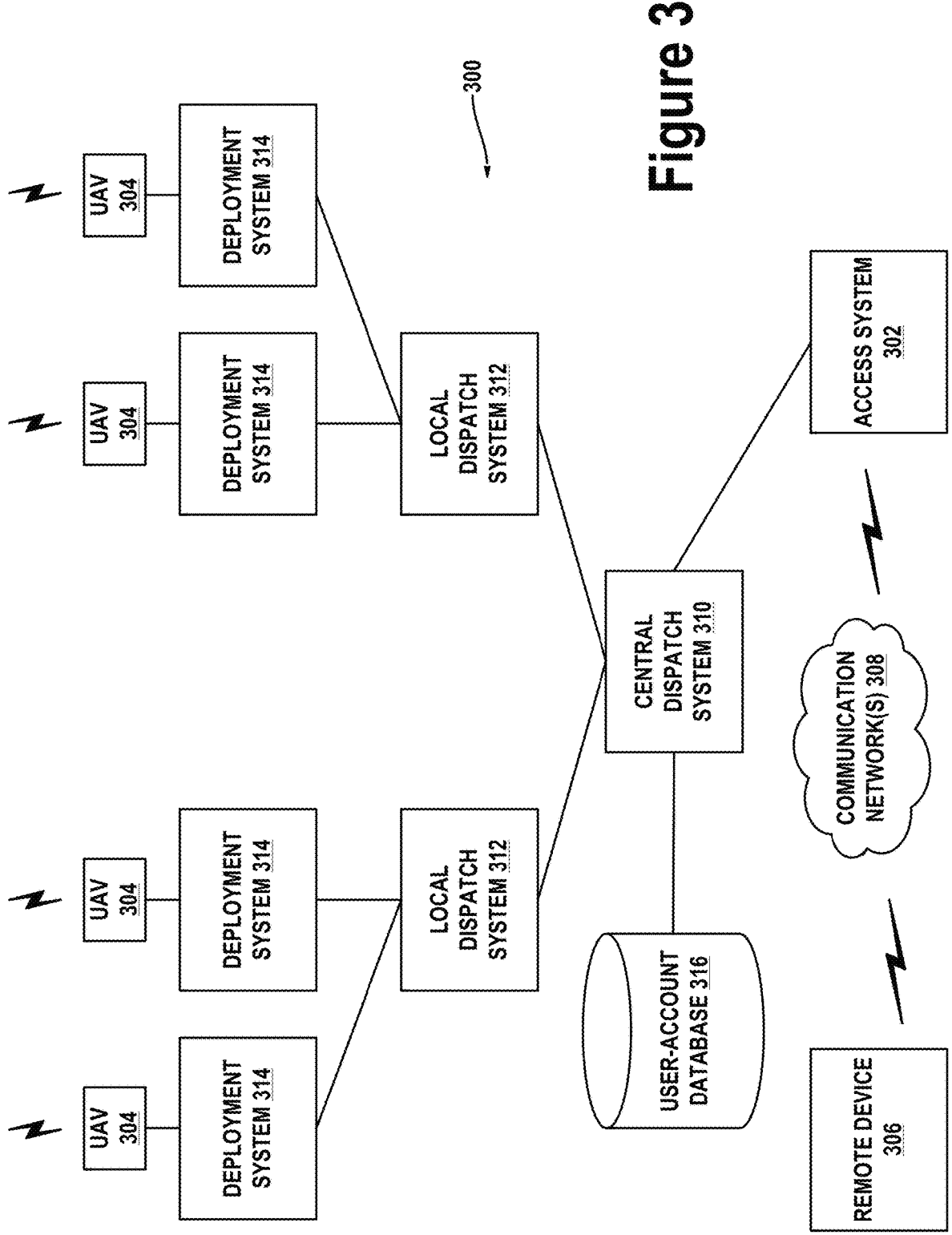
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any, communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication networks) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated users permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEMS AND METHODS FOR CONTROLLING THE UAV TO AVOID OBJECTS

To carry out a delivery process of delivering a payload, a UAV may navigate to a delivery location and verify that the delivery location is still an optimal location for delivery of the payload. The UAV may capture one or more images of the delivery location to facilitate determining and evaluating delivery points. If the UAV determines that delivery cannot be successfully completed at a delivery location, the UAV may change the delivery location and/or abort the delivery process.

Figure 4:
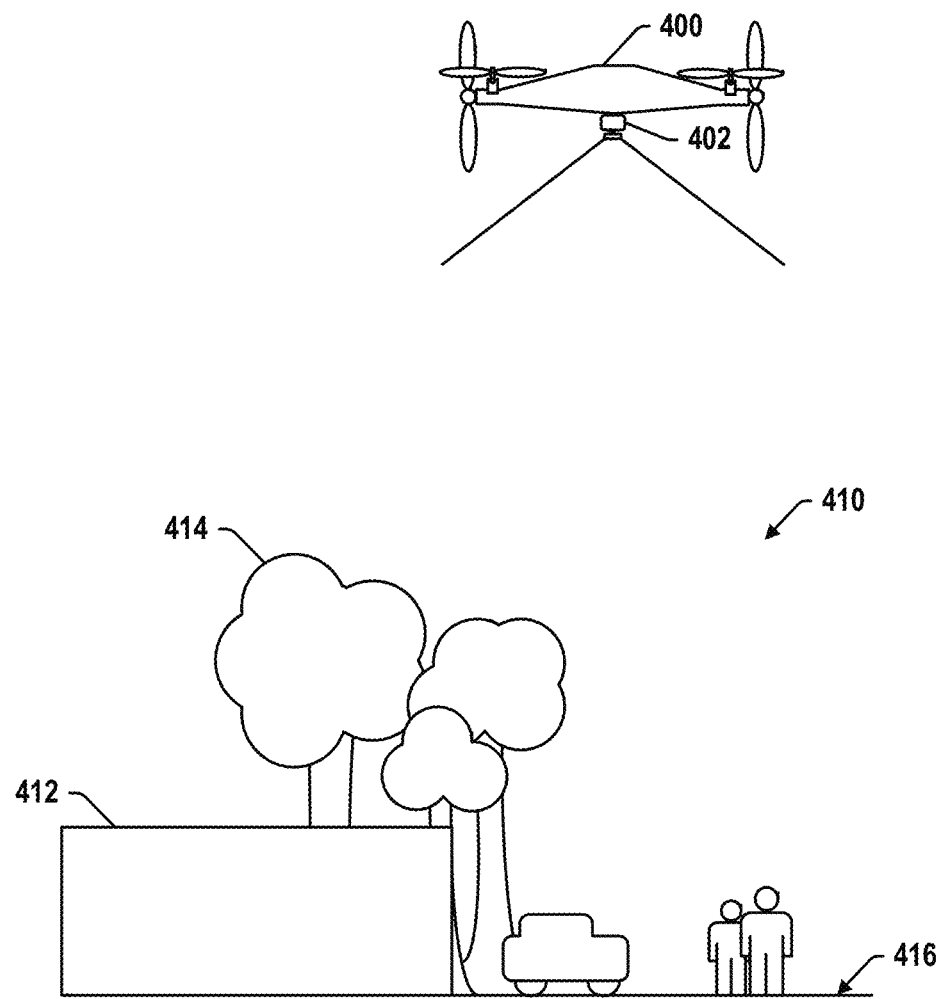
FIG. 4 illustrates a UAV capturing an image of a delivery location, in accordance with example embodiments.

FIG. 4 illustrates UAV 400 capturing an image of delivery location 410, in accordance with example embodiments. UAV 400 may have a configuration similar to example UAVs discussed above, e.g., UAV 100. In some examples, UAV 400 may include a sensor, such as downward-facing stereo camera 402. Downward-facing stereo camera 402 may be a camera arrangement with two or more cameras, such that each of the two cameras may be configured to take overlapping images of the environment. UAV 400 may control downward-facing stereo camera 402 to take images of the environment to determine where to navigate to avoid objects, among other uses. These images may be representative of the location below the UAV.

Further, UAV 400 may include other sensor arrangements, e.g., depth sensor arrangements. In some examples, these depth sensor arrangements could include two or more cameras that work in conjunction to facilitate depth perception. Depth sensor arrangements could also include a single depth sensor, e.g., a LIDAR sensor. These sensor arrangements could help provide further information about the delivery location, including heights of objects to be avoided, among other information.

In the example depicted by FIG. 4, delivery location 410 may include building 412, trees 414, and ground surface 416, among other elements. Some of the elements of delivery location 410, e.g., building 412 and trees 414 may be objects that may need to be avoided while delivering a payload, whereas other elements of delivery location 410, e.g., ground surface 416 may be reasonable locations to deliver a payload.

Downward-facing stereo camera 402 may generate various data. As mentioned above, downward-facing stereo camera 402 may be a camera arrangement with two or more cameras, such that each of the two cameras may be configured to take overlapping images of the environment. In some examples, downward-facing stereo camera 402 may output depth images, perhaps first capturing overlapping images of the environment and using the overlapping images of the environment as a basis to determine depth images. Depth images may include one or more pixels, where each pixel represents the distance from downward-facing, stereo camera 402 to an object in the environment. For example, a depth image may include one or more pixels that include the distance from downward-facing stereo camera 402 to trees 414.

Figure 5:
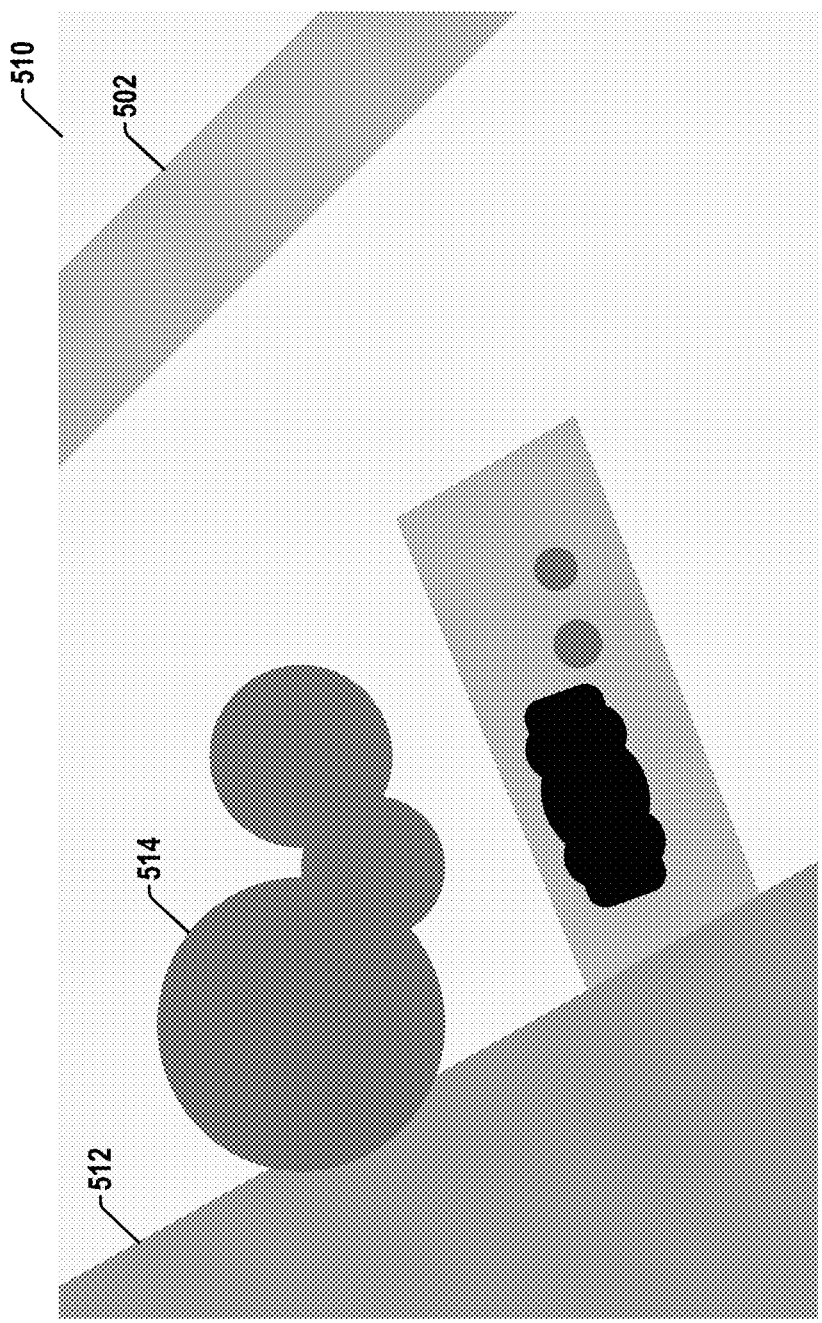
FIG. 5 illustrates an image, in accordance with example embodiments.

FIG. 5 illustrates image 510, in accordance with example embodiments. A camera or other sensor arrangement, e.g., downward-facing stereo camera 402, may have captured image 510. As shown, image 510 depicts building 512, trees 514, sidewalk 502, among other objects in the environment. In some examples, downward-facing stereo camera 402 may include two or more cameras arranged to take images of an overlapping location. One of the stereo cameras may output image 510 of delivery location 410. Each of the images from the one or more cameras may be combined into a single image of delivery location 410, similar to image 510, and/or be combined into a depth image.

Figure 6:
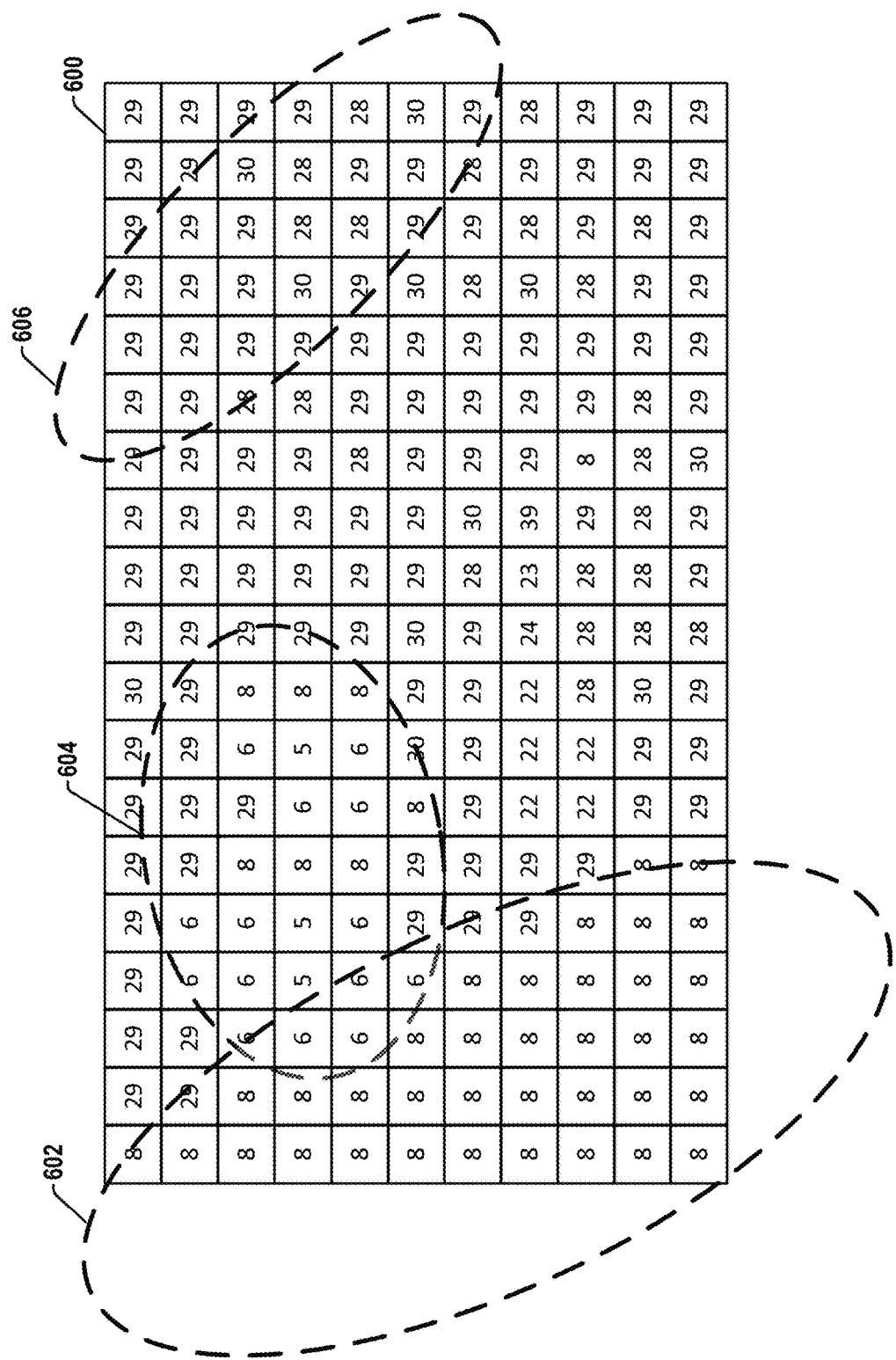
FIG. 6 illustrates a depth image, in accordance with example embodiments.

FIG. 6 illustrates depth image 600, in accordance with example embodiments. Depth image 600 may be taken or received from the downward-facing stereo cameras. In some examples, a downward-facing stereo camera may comprise a pair of imagers spaced adjacent to one another that are configured to simultaneously capture side-by-side images of the environment below the UAV. The relative distances between corresponding pixels in the side-by-side images associated with a particular object (e.g., driveways, structures, foliage, fences, vehicles, powerlines, etc.) facilitate determining the distance of an object from the depth camera. This, in turn, facilitates determining the distance or depth of an object relative to the UAV.

As shown in FIG. 6, depth image 600 may include one or more pixels that are associated with depth values indicative of distances from one or more objects to the downward-facing stereo camera of the UAV. For example, pixels within region 602 of depth image 600 may include distances from downward-facing stereo camera 402 of UAV 400 to building 412. Pixels within region 604 of depth image 600 may include distances from downward-facing stereo camera 402 of UAV 400 to trees 414. Pixels within region 606 of depth image 600 may include distances from downward-facing stereo camera 402 of UAV 400 to a sidewalk.

The depth values associated with the pixels of depth image 600 may vary based on the height and geometry of the object in the environment at the respective pixel. For example, building 412 may have a flat roof and be 22 meters above the ground. If the downward-facing stereo camera captured the image at an altitude of 30 meters, pixels in region 602 may indicate that the UAV is eight meters away from the building. As another example, the pixels in region 604 may indicate the distance from the downward-facing stereo camera to a tree, which may have more varied height than a building, thereby making the pixel values in 604 more varied.

In some examples, one or more of the depth values in depth image 600 may be inaccurate. For example, the depth image captured by the downward-facing stereo camera may depict the roof of building 512, which may have repeat patterns. These patterns may cause the depth values to be inaccurate. Other environmental factors, e.g., lighting, shadows, fog, etc., may also cause depth image 600 to be inaccurate.

Depth image 600 is provided for illustration purposes. Depth images captured by a downward-facing stereo camera may include more or less pixels and/or may include values other than those illustrated in depth image 600, among other variations.

To determine whether to continue the delivery process, the UAV may determine a sample area within the depth image to evaluate. FIG. 7 illustrates sample area 702 within depth image 600, in accordance with example embodiments. As shown, sample area 702 may be a circle centrally located in depth image 600. Additionally or alternatively, sample area 702 may be such that the sample area represents an area of the delivery location directly below the UAV. In particular, the sample area may be centered around a pixel that is directly below the UAV, perhaps along the gravity vector of the UAV. In some examples, sample area 702 may have a diameter of approximately half the shortest edge of depth image 600 (or half the height of depth image 600). Using only half of the shortest edge of depth image 600 may remove objects with large lateral distance from the aircraft (e.g., building 412). The sample area may trace out a cone below the aircraft with a particular angle. A larger sample area may result in the depth estimate being affected by objects at a farther lateral distance from the aircraft. In some examples, the UAV may adjust the size of the sample area based on the proximity of the UAV to the ground.

The UAV may evaluate the value of the pixels within sample area 702 to determine an estimated depth value, which the UAV may then use as a basis to determine whether to abort the delivery process. In some examples, the UAV may determine the estimated depth value based on the estimated depth value being at a particular percentile of the depth values in sample area 702. For example, the UAV may sort the depth values within sample area 702 in ascending order and determine which depth value is at a particular percentile to use as the estimated depth value. In some examples, the particular percentile may be 15 percent, which may skew results to lesser depth values associated with objects closer to the UAV With sample area 702, the UAV may determine that the 15th percentile may be eight meters, and the UAV may use this estimated depth value as a representative depth value of sample area 702.

In some examples, the particular percentile may be adjusted based on the potential objects in the environment. For example, using the 15th percentile, the UAV may be able to appropriately react in situations where a branch occupies less than half the sample area. In contrast, if the UAV is in an environment with many small detectable objects that may not affect the ability of the UAV to land, the UAV may adjust the particular percentile to be a higher percentile (e.g., 20th percentile).

In some examples, the UAV may receive a depth image from the downward-facing camera that includes invalid pixels. For example, FIG. 8 depicts depth image 800, in accordance with example embodiments. A UAV may evaluate depth images with invalid pixels by verifying that the sample area of the depth image has enough valid pixels for the estimated depth value to be reliable.

For example, the UAV may determine the number of invalid pixels in sample area 802 of depth image 800 and the UAV may use this number of invalid pixels to determine whether the estimated depth value is valid. The UAV may determine that the number of invalid pixels within sample area 920 is six and that there are 21 pixels within sample area 920, resulting in 29% of the pixels being invalid. The UAV may determine that this percentage is greater than a threshold percentage (e.g., 25%), thereby making the estimated depth value of sample area 802 invalid. In some examples, the UAV may first determine whether an estimated depth value is valid (e.g., that sample area 802 contains less than a threshold percentage of invalid pixels), before determining an estimated depth value. Additionally or alternatively, the UAV may first determine an estimated depth value before determining whether the estimated depth value is valid.

Figure 9:
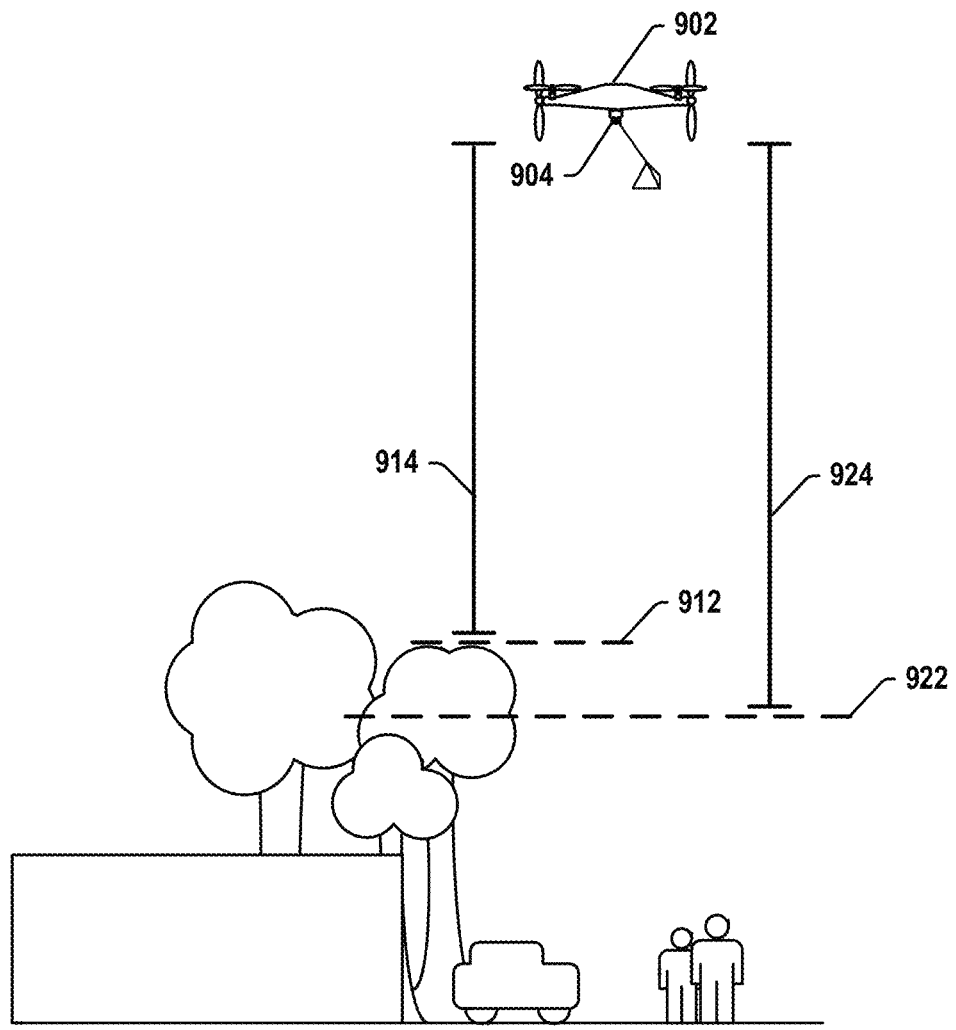
FIG. 9 illustrates an estimated depth value and a trigger depth, in accordance with example embodiments.

The UAV may compare the estimated depth value with a trigger depth to determine whether to continue the delivery process. FIG. 9 illustrates estimated depth value 904 and trigger depth 924, in accordance with example embodiments. As illustrated, estimated depth value 904 may represent the distance from downward-facing stereo camera 914 of UAV 902 to altitude 912. FIG. 9 also illustrates trigger depth 924, which may represent the distance from downward-facing stereo camera 914 to altitude 922.

UAV 902 may determine to abort the delivery process upon determining that estimated depth value 904 is less than trigger depth 924. In some examples, UAV 902 may need to descend to altitude 922 in order to complete delivery of a payload. However, if the estimated depth value is less than the distance from UAV 902 to altitude 922, the UAV may not be able to complete delivery of the payload. Thus, UAV 902 may abort delivery of the payload if an estimated depth value is less than a trigger depth.

As discussed above, the depth images determined by downward-facing stereo camera 914 may contain inaccuracies. UAV 902 may execute an arming period to correct and/or reject these inaccuracies. For example, downward-facing stereo camera 914 may capture a plurality of consecutive depth images, and downward-facing stereo camera 914 may send these images to UAV 902 as the images are captured. UAV 902 may receive the plurality of consecutive depth images, and UAV 902 may analyze each of these depth images to determine a respective estimated depth value for each of the consecutive depth images. If each of the respective depth values are less than an arming depth, then UAV 902 may then evaluate depth images against the trigger depth. For example, UAV may determine whether the estimated depth values of the consecutive depth images are less than a trigger depth after determining that the estimated depth values are less than the arming depth. Additionally or alternatively, after determining that each of the respective depth values are less than the arming depth, UAV 902 may determine an additional consecutive depth image and based on the additional consecutive depth image, determine an additional estimated depth. UAV 902 may then abort the delivery process if the additional estimated depth is less than the trigger depth. In some examples, UAV 902 may determine whether to abort the delivery process based on the trigger depth after evaluating a particular number of consecutive depth images that have respective estimated depth values of being less than the arming depth. For example, UAV 902 may abort the delivery process after evaluating four consecutive depth images that have respective estimated depth values of being less than the trigger depth. Further, UAV 902 may capture these consecutive depth images periodically, e.g., at a frequency of 5 Hz. Still further, the trigger depth may be less than the arming depth. For example, the arming depth may be 10 meters, whereas the trigger depth may be 4-7 meters.

Additionally or alternatively, UAV 902 may analyze a periodic stream of depth images, and UAV 902 may trigger aborting the delivery process once UAV 902 detects a threshold number of consecutive depth images with estimated depth values less than the trigger depth. For example, the threshold number may be four, and UAV 902 may trigger aborting the delivery process once UAV 902 detects the fourth consecutive depth image with estimated depth values less than the trigger depth.

Figure 10:
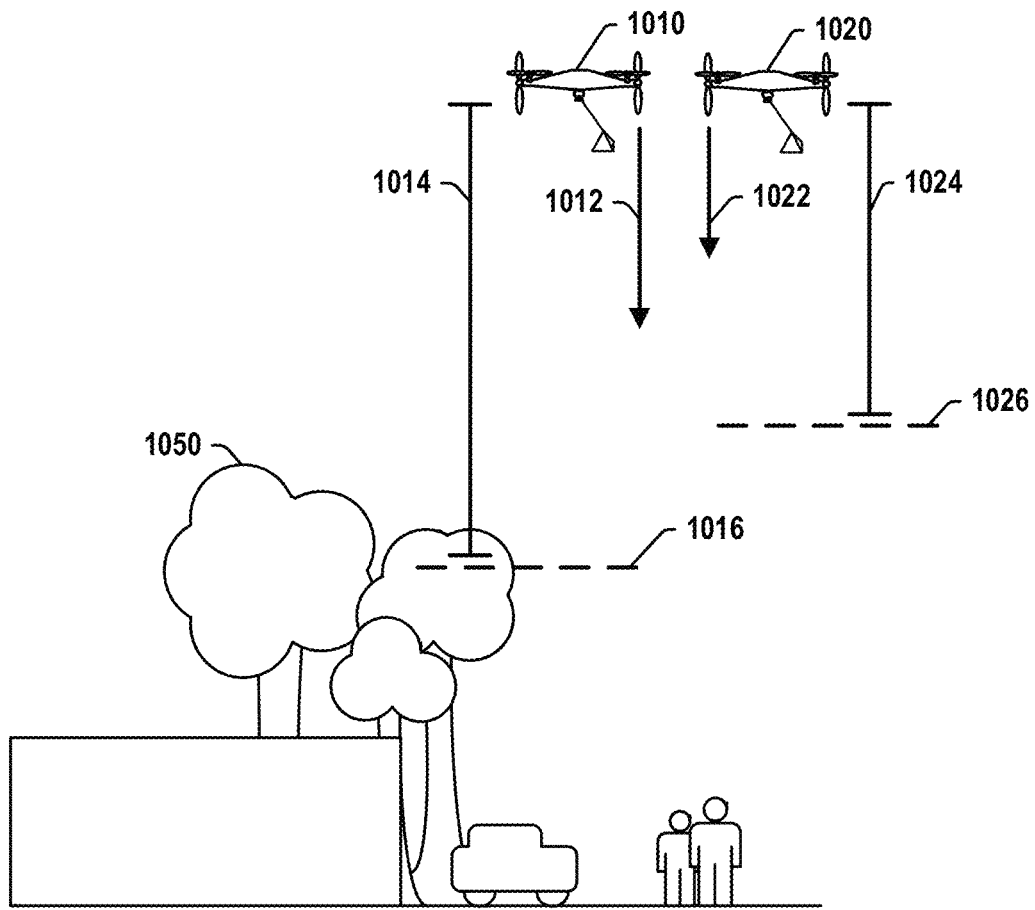
FIG. 10 depicts descent speeds and trigger depths, in accordance with example embodiments.

In some examples, trigger depth may depend on vertical descent speeds. FIG. 10 depicts vertical descent speeds and trigger depths, in accordance with example embodiments. FIG. 10 includes UAV 1010 and UAV 1020, where each UAV is descending at a different vertical speed. In some examples, UAV 1010 and 1020 may also be navigating horizontally at various horizontal speeds.

UAV 1010 and UAV 1020 may use vertical descent speeds as a basis to determine a trigger depth. For example, UAV 1010 may be descending with vertical descent speed 1012, and UAV 1020 may be descending with vertical descent speed 1022. Vertical descent speed 1012 may be greater than vertical descent speed 1022. Due to having a greater vertical descent speed, UAV 1010 may have a greater trigger depth, e.g., trigger depth 1014. Trigger depth 1014 may be the distance from a downward-facing stereo camera of UAV 1010 to altitude 1016. In contrast, UAV 1020 may have a lesser trigger depth, e.g., trigger depth 1024 due to UAV 1020 having a lesser vertical descent speed. Trigger depth 1024 may be the distance from a downward-facing stereo camera of UAV 1020 to altitude 1026.

UAV 1020 having a lesser trigger depth than UAV 1010 may help to avoid collisions. In particular, a UAV traveling at greater vertical speeds (e.g., UAV 1010) may need more distance to stop and reverse course, while a UAV traveling at lesser vertical speeds (e.g., UAV 1020) may need less distance to stop and reverse course. Therefore, the trigger depths of each respective UAV may take into account the distance the UAV may need to stop and reverse course. As an example, the UAV may determine or store that a vertical speed of less than 0.5 m/s is associated with a trigger depth of 4 meters and that a vertical speed of 3 m/s or above is associated with a trigger depth of 6.5 meters. Therefore, if a UAV determines that its vertical speed during descent is 0.25 m/s, then the UAV may determine that the trigger depth is 4 meters. In contrast, if the UAV determines that its vertical speed during descent is 5 m/s, then the UAV may determine that the trigger depth is 6.5 meters.

Thus, during a delivery process, UAV 1010 and UAV 1020 may choose differently in determining whether to abort. For example, in FIG. 10, UAV 1010 and UAV 1020 may each capture a depth image of the environment and detect that the estimated depth value of the sample area is 5 meters (e.g., based on the distance to object 1050). UAV 1010 may be traveling at a greater speed and have a trigger depth of 6.5 meters, while UAV 1020 may be traveling at a lesser speed and have a trigger depth of 4 meters. Because 5 meters is less than 6.5 meters, UAV 1010 may abort the delivery process, while UAV 1020 may determine that 5 meters is greater than 4 meters and continue the delivery process.

In some examples, the trigger depth may depend on the stage of the descent. For example, the trigger depth may normally be eight meters or more. However, if the UAV is further along in the descent (e.g., when the UAV is seven meters or less from the ground), the UAV may use a lesser trigger distance (e.g., about 4 meters) to account for variations in sensing and potential tracking errors.

The methods described herein may generally be used when the UAV is descending and are not limited to being used during a delivery process of the UAV. For example, the UAV may use the methods described herein during landing. If the UAV determines that an estimated depth value of the landing location is less than a trigger depth and that the landing at that location should be aborted, the UAV may navigate to another landing location.

In some examples, the UAV may include a tether carrying a payload, and the trigger depth may be based on the use of a tether during delivery of the payload. In particular, if the UAV delivers the payload by using a tether, the trigger depth may be based on the altitude at which the UAV stops to lower the tether. Further, the delivery process may involve delivering the payload with the tether partially extended. If the UAV aborts the delivery process, the UAV may abort the delivery process with the tether at least partially extended and/or the UAV may attempt to navigate away from the delivery location with the tether at least partially extended.

VI. EXAMPLE METHODS

Figure 11:
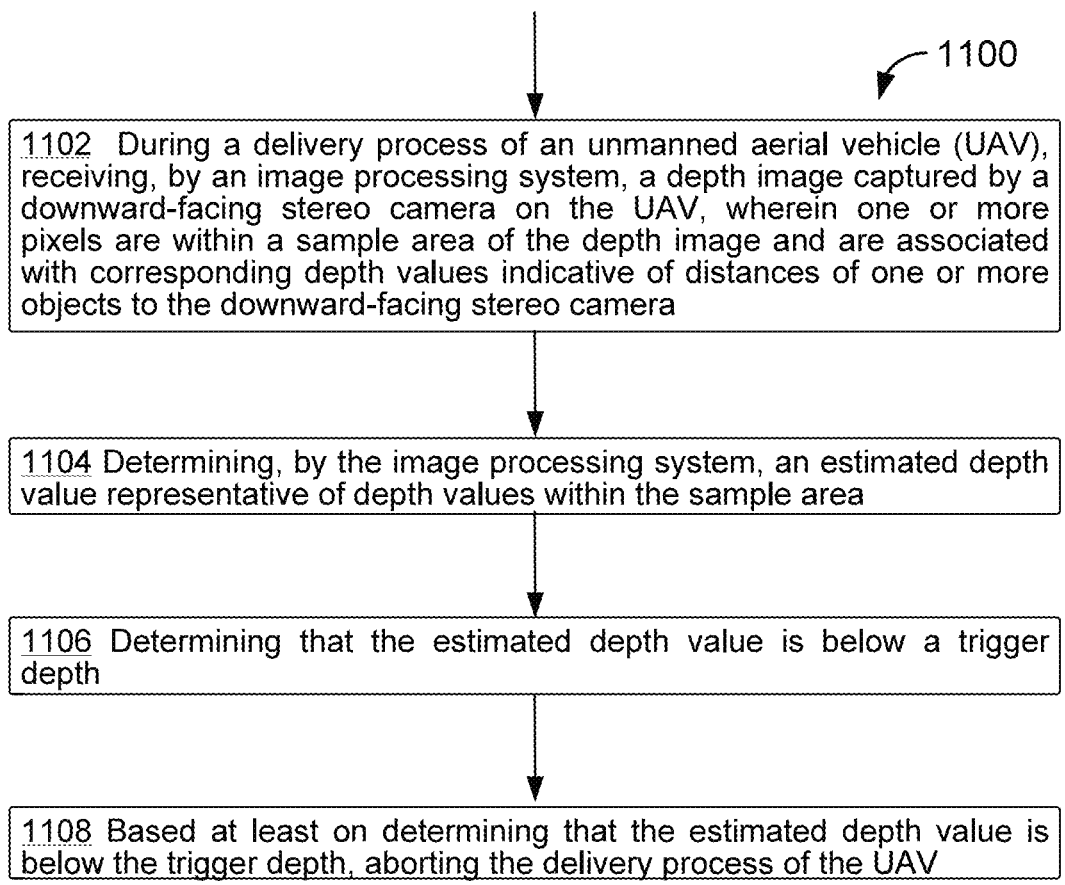
FIG. 11 is a block diagram of a method, in accordance with example embodiments.

FIG. 11 is a block diagram of method 1100, in accordance with example embodiments. In some examples, method 1100 may be carried out by a control system. In further examples, method 1100 may be carried out by one or more processors, executing program instructions stored in a data storage. Execution of method 1100 may involve a UAV, such as the UAV illustrated and described with respect to FIGS. 1-2. Other UAVs may also be used in the performance of method 1100. In further examples, some or all of the blocks of method 1100 may be performed by a control system remote from the UAV. In yet further examples, different blocks of method 1100 may be performed by different control systems, located on and/or remote from a UAV.

As mentioned, FIG. 11 is a block diagram of method 1100, in accordance with example embodiments.

At block 1102, method 1100 includes, during a delivery process of an unmanned aerial vehicle (UAV), receiving, by an image processing system, a depth image captured by a downward-facing stereo camera on the UAV, wherein one or more pixels are within a sample area of the depth image and are associated with corresponding depth values indicative of distances of one or more objects to the downward-facing stereo camera.

At block 1104, method 1100 includes determining, by the image processing system, an estimated depth value representative of depth values within the sample area.

At block 1106, method 1100 includes determining that the estimated depth value is below a trigger depth.

At block 1108, method 1100 includes based at least on determining that the estimated depth value is below the trigger depth, aborting the delivery process of the UAV.

In some examples, method 1100 may further include determining a vertical descent speed of the UAV, and determining, based on the vertical descent speed of the UAV, the trigger depth.

In some examples, the vertical descent speed may be a greater vertical descent speed and may correspond with the trigger depth being a greater trigger depth. In some examples, the vertical descent speed may be a lesser vertical descent speed and may correspond with the trigger depth being a lesser trigger depth.

In some examples, the trigger depth may be based on a distance of the UAV from a surface of a delivery location of the delivery process.

In some examples, determining the estimated depth value representative of depth values within the sample area may include determining an ascending sorted list of depth values corresponding to the one or more pixels within the sample area, and determining the estimated depth value based on the estimated depth value being above a threshold percentage of depth values in the ascending sorted list.

In some examples, method 1100 may further include receiving, by the image processing system, an additional depth image captured by the downward-facing stereo camera on the UAV. Method 1100 may further include determining, by the image processing system, a respective estimated depth value representative of depth values within a respective sample area of the additional depth image captured by the UAV Method 1100 may also include determining a percentage of invalid pixels within the respective sample area, wherein invalid pixels within the respective sample area are associated with having no corresponding depth values. Method 1100 may additionally include determining that the percentage of invalid pixels within the respective sample area is above a threshold percentage. Further method 1100 may include, based on determining that the percentage of invalid pixels within the respective sample area is above the threshold percentage, discarding the respective estimated depth value.

In some examples, method 1100 may include determining a percentage of invalid pixels within the sample area, wherein invalid pixels within the sample area are associated with having no corresponding depth values, and determining that the percentage of invalid pixels within the sample area is less than a threshold percentage, wherein aborting the delivery process of the UAV is based on determining that the percentage of invalid pixels within the sample area is less than the threshold percentage.

In some examples, method 1100 may include receiving one or more additional depth images consecutively captured by the downward-facing stereo camera on the UAV and determining, by the image processing system, one or more additional estimated depth values, wherein each additional estimated depth value is representative of a respective estimated depth value within a respective sample area of a respective additional depth image of the one or more additional depth images.

In some examples, the method may further include determining that the one or more additional estimated depth values are also less than an arming depth, wherein aborting the delivery process of the UAV is further based on determining that the one or more additional estimated depth values are less than the arming depth.

In some examples, determining that the one or more additional estimated depth values are also less than the arming depth may be performed before determining that the estimated depth value is less than the trigger depth. The trigger depth may be less than the arming depth.

In some examples, the depth image and the one or more additional depth images may be captured at a particular frequency.

In some examples, the depth image may be captured above an intended delivery location of the delivery process.

In some examples, method 1100 may further comprise causing the downward-facing stereo camera of the UAV to capture an image of a delivery location of the delivery process, wherein receiving the depth image is in response to causing the downward-facing stereo camera of the UAV to capture an image.

In some examples, the method may further comprise causing the UAV to descend to a predetermined altitude above ground level before causing the downward-facing stereo camera of the UAV to capture the image of the delivery location.

In some examples, the sample area may be a circle of a fixed area relative to the depth image.

In some examples, the sample area may be centered around a pixel representative of a location directly below the UAV.

In some examples, the image may have a shorter length and a longer length. The sample area may be a circle centered relative to the depth image and may have a diameter of half the shorter length of the image.

In some examples, a UAV may include a downward-facing camera and a control system. The control system of the UAV may be configured to carry out the steps of method 1100.

In some examples, the UAV may further include a tether, where the delivery process of the UAV comprises delivering a payload with the tether at least partially extended.

In some examples, a non-transitory computer readable medium may include program instructions executable by one or more processors to perform operations. The operations may include the steps of method 1100.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
during a delivery process of an unmanned aerial vehicle (UAV), receiving, by an image processing system, a depth image captured by a downward-facing stereo camera on the UAV, wherein one or more pixels are within a sample area of the depth image and are associated with corresponding depth values indicative of distances of one or more objects to the downward-facing stereo camera;
determining, by the image processing system, an estimated depth value representative of depth values within the sample area;
determining that the estimated depth value is less than a trigger depth, wherein the trigger depth and the estimated depth value are each measured from the downward-facing stereo camera on the UAV; and
based at least on determining that the estimated depth value is less than the trigger depth, aborting the delivery process of the UAV.

2. The method of claim 1, wherein the method further comprises:
determining a vertical descent speed of the UAV; and
determining, based on the vertical descent speed of the UAV, the trigger depth.

3. The method of claim 2, wherein an increase in the vertical descent speed corresponds with an increase in the trigger depth and a decrease in the vertical descent speed corresponds with a decrease in the trigger depth.

4. The method of claim 1, wherein the trigger depth is based on a distance of the UAV from a surface of a delivery location of the delivery process.

5. The method of claim 1, wherein determining the estimated depth value representative of depth values within the sample area comprises:
determining an ascending sorted list of depth values corresponding to the one or more pixels within the sample area; and
determining the estimated depth value to be greater than a threshold percentage of depth values in the ascending sorted list.

6. The method of claim 1, further comprising:
receiving, by the image processing system, an additional depth image captured by the downward-facing stereo camera on the UAV
determining, by the image processing system, a respective estimated depth value representative of depth values within a respective sample area of the additional depth image captured by the UAV;
determining a percentage of invalid pixels within the respective sample area, wherein invalid pixels within the respective sample area are associated with having no corresponding depth values;
determining that the percentage of invalid pixels within the respective sample area is above a threshold percentage; and
based on determining that the percentage of invalid pixels within the respective sample area is above the threshold percentage, discarding the respective estimated depth value.

7. The method of claim 1, further comprising:
determining a percentage of invalid pixels within the sample area, wherein invalid pixels within the sample area are associated with having no corresponding depth values; and
determining that the percentage of invalid pixels within the sample area is less than a threshold percentage, wherein aborting the delivery process of the UAV is based on determining that the percentage of invalid pixels within the sample area is less than the threshold percentage.

8. The method of claim 1, further comprising:
receiving one or more additional depth images consecutively captured by the downward-facing stereo camera on the UAV; and
determining, by the image processing system, one or more additional estimated depth values, wherein each additional estimated depth value is representative of a respective estimated depth value within a respective sample area of a respective additional depth image of the one or more additional depth images.

9. The method of claim 8, further comprising:
determining that the one or more additional estimated depth values are also less than an arming depth, wherein aborting the delivery process of the UAV is further based on determining that the one or more additional estimated depth values are less than the arming depth.

10. The method of claim 8, wherein determining that the one or more additional estimated depth values are also less than the arming depth is performed before determining that the estimated depth value is less than the trigger depth, wherein the trigger depth is less than the arming depth.

11. The method of claim 8, wherein the depth image and the one or more additional depth images are captured at a particular frequency.

12. The method of claim 1, wherein the depth image is captured above an intended delivery location of the delivery process.

13. The method of claim 1, further comprising:
causing the downward-facing stereo camera of the UAV to capture an image of a delivery location of the delivery process, wherein receiving the depth image is in response to causing the downward-facing stereo camera of the UAV to capture an image.

14. The method of claim 13, further comprising:
causing the UAV to descend to a predetermined altitude above ground level before causing the downward-facing stereo camera of the UAV to capture the image of the delivery location.

15. The method of claim 1, wherein the sample area is a circle of a fixed area relative to the depth image.

16. The method of claim 1, wherein the sample area is centered around a pixel representative of a location directly below the UAV.

17. The method of claim 1, wherein the image has a shorter length and a longer length, wherein the sample area is a circle centered relative to the depth image and having a diameter of half the shorter length of the image.

18. An unmanned aerial vehicle (UAV), comprising:
a downward-facing stereo camera; and
a control system configured to:
during a delivery process of the UAV, receive, by an image processing system, a depth image captured by the downward-facing stereo camera on the UAV, wherein one or more pixels are within a sample area of the depth image and are associated with corresponding depth values indicative of distances of one or more objects to the downward-facing stereo camera;
determine, by the image processing system, an estimated depth value representative of depth values within the sample area;
determine that the estimated depth value is less than a trigger depth, wherein the trigger depth and the estimated depth value are each measured from the downward-facing stereo camera on the UAV; and
based at least on determining that the estimated depth value is less than the trigger depth, abort the delivery process of the UAV.

19. The UAV of claim 18, further comprising a tether, wherein the delivery process of the UAV comprises delivering a payload with the tether at least partially extended.

20. A non-transitory computer readable medium comprising program instructions executable by one or more processors to perform operations, the operations comprising:
during a delivery process of a UAV, receiving, by an image processing system, a depth image captured by a downward-facing stereo camera on the UAV, wherein one or more pixels are within a sample area of the depth image and are associated with corresponding depth values indicative of distances of one or more objects to the downward-facing stereo camera;
determining, by the image processing system, an estimated depth value representative of depth values within the sample area;
determining that the estimated depth value is less than a trigger depth, wherein the trigger depth and the estimated depth value are each measured from the downward-facing stereo camera on the UAV; and
based at least on determining that the estimated depth value is less than the trigger depth, aborting the delivery process of the UAV.

* * * * *